United States Patent
Wilkes, Jr. et al.

(10) Patent No.: US 6,757,382 B1
(45) Date of Patent: Jun. 29, 2004

(54) QUASI GROUND FAULT INTERRUPTION SIGNAL-BASED ACTIVATION OF EMERGENCY POTS BY-PASS PATHS FOR LINE-POWERED DIGITAL SUBSCRIBER LOOP

(75) Inventors: John B. Wilkes, Jr., Harvest, AL (US); Steven M. Robinson, Madison, AL (US)

(73) Assignee: Adtran, Inc., Huntsville, AL (US)

( * ) Notice: Subject to any disclaimer, the term of this patent is extended or adjusted under 35 U.S.C. 154(b) by 0 days.

(21) Appl. No.: 09/478,905

(22) Filed: Jan. 7, 2000

(51) Int. Cl.$^7$ .......................... H04M 1/00; H04M 9/00; H04M 9/08
(52) U.S. Cl. .............................. 379/399.01; 379/22.03; 379/30; 379/22.07; 379/413; 379/413.01
(58) Field of Search .................... 379/22.04, 27.06, 379/29.03, 29.04, 29.07, 32.04, 1.04, 2, 93.09, 100.15, 100.16, 399.01, 399.02, 412, 413, 413.01

(56) References Cited

U.S. PATENT DOCUMENTS 5,610,922 A    3/1997   Balatoni
6,272,209 B1 *  8/2001   Bridger et al.

\* cited by examiner

*Primary Examiner*—Duc Nguyen
(74) *Attorney, Agent, or Firm*—Allen, Dyer, Doppelt, Milbrath & Gilchrist, P.A.

(57) ABSTRACT

A 'lifeline' POTS back-up mechanism is operative to provide emergency plain old telephone service connectivity over a span-powered two-wire metallic digital subscriber loop pair, in response to a customer's phone going off-hook, during a lack of normal operating condition of the digital circuit path. A ground fault interruption signal is generated in a remote terminal and used to activate respective POTS by-pass paths in the remote terminal and a central office terminal.

5 Claims, 4 Drawing Sheets

QUASI GROUND FAULT INTERRUPTION SIGNAL-BASED ACTIVATION OF EMERGENCY POTS BY-PASS PATHS FOR LINE-POWERED DIGITAL SUBSCRIBER LOOP

FIELD OF THE INVENTION

The present invention relates in general to telecommunication systems, and is particularly directed to a new and improved signaling arrangement and method for supplying emergency 'lifeline' plain old telephone service (POTS) connectivity over a two-wire metallic digital subscriber loop (DSL) pair, such as that employed for ISDN communications. A (quasi) ground fault interruption (GFI) signal is generated by a remote terminal (RT) in response to a customer's POTS phone going off-hook, during a lack of normal operating condition of the DSL circuit. This GFI signal is used to activate a POTS by-pass path in the RT and a POTS by-pass path at a central office terminal (COT).

BACKGROUND OF THE INVENTION

Digital telecommunication systems, such as, but not limited to integrated services digital network (ISDN) communication systems, enable telecommunication service providers to supply multiple types of signalling channels from a central office site using a local twisted pair, termed a digital subscriber loop (DSL), to a network termination interface at a customer premises site. FIG. 1 diagrammatically illustrates a reduced complexity example of a span-powered DSL system for supplying POTS and ISDN communication services over a local loop. As a non-limiting example, such a span-powered DSL system may be of the type described in the U.S. Pat. No. 5,774,316, to J. McGray et al, entitled: "Ground Fault Detector for Line-Powered Telephone Network," assigned to the assignee of the present application and the disclosure of which is incorporated herein.

As shown in FIG. 1, the span-powered DSL system comprises a central office site 1, located at a 'west' end of a twisted pair 30, and a customer premises site 2 that terminates the 'east' end of the loop. The central office site 1 includes a conventional POTS switch 3 (such as a 5ESS switch manufactured by AT&T), which: contains a plurality of line termination circuits (or line cards) 4, and an ISDN switch 5, which contains a plurality of ISDN cards 6. These respective circuits are interfaced with the local loop 30 by means of multiplexer circuitry 7 within a central office terminal (COT) 10. Power for the COT 10 is provided by way of local isolated span supply 8, which is (transformer) coupled to the metallic link from the central office. At the customer premises site 2, the local loop 30 is coupled directly to a remote terminal 20, which serves a customer's digital terminal equipment (DTE) 24 and local POTS phone 29. As in the central office terminal, these circuits are interfaced with local loop 30 by means of multiplexer circuitry 23; power for components of the remote terminal is provided by way of a local span supply 28, which is coupled to wireline link 30.

Although the public service commissions of local jurisdictions, where customer premises equipment is installed, require telephone service providers (regional Bell operating companies) to ensure that each customer is continuously provided with emergency (911) telephone service in the event the DSL equipment at the remote terminal becomes non-functional (such as may be due to a loss in synchronization or a less than fully synchronized condition of the digital circuitry), the service provider is not permitted to dictate that a subscriber install a particular piece of equipment.

As a consequence, service providers customarily require that their residential subscribers maintain a separate POTS line as an emergency 'lifeline' adjunct to the DSL (ISDN) service, so that the residential customer is, in effect, forced to subscribe to an additional form of 'fire insurance'. Namely, the extra POTS line (which normally goes unused) is intended to prevent residential customers from losing access to telephone service, particularly in the event of an emergency, where expedient 911 service may be critical. Such a requirement obviously constitutes a substantial cost penalty to the customer, who is faced with both a potential installation fee, and an unwanted monthly bill for a normally unused auxiliary line.

SUMMARY OF INVENTION

In accordance with the present invention, the need to ensure continuous telephone service to a residential customer premises served by a DSL, such as one used for ISDN, without requiring that the customer pay for an additional (and potentially unnecessary) POTS line as an emergency back-up, is successfully addressed by a modification of conventional signaling circuits and network termination interface components of the central office terminal and the remote terminal to include an auxiliary POTS by-pass path. Each auxiliary path is normally decoupled from its terminal's signaling equipment, but is controllably coupled in circuit with the wireline pair, so as to provide an emergency or 'lifeline' POTS by-pass path between the central office and the subscriber's POTS phone in the event that the subscriber needs to place a POTS call during a less than fully functional condition of the DSL circuitry.

In particular, the remote terminal circuitry serving the customer premises site is augmented to generate a (quasi) GFI signal should two conditions occur. The first is a lack of normal operation of the DSL circuit, as may result from a lack of digital link synchronization, as a non-limiting example. The second condition is a POTS phone at the remote terminal going off-hook. Unless both of these conditions occur, signaling path connectivity is provided through the central office terminal and the remote terminal through DSL/POTS multiplexer circuitry and a pair of energized auxiliary relay circuits.

This normal operation connectivity state continues to be maintained, as long as such normal DSL operating conditions are present, so as to provide both analog and digital communications, including allowing customer to place a POTS call, by way of the fully operational DSL circuitry of each of the COT and the RT. This normal operation connectivity state will also be maintained in the absence of a fully functional DSL link, so long as there is no attempt by a customer to place a POTS call. While the absence of a fully functional DSL link could be due to an operational anomaly, it is also an inherent condition of the DSL link during initialization (including transmission and detection of a training sequence) of the DSL circuit.

If the customer attempts to place a POTS call (goes off-hook) during a less than fully functional state of the DSL circuit, the state of a DSL sync input to a POTS by-pass condition detector in the remote terminal will indicate non-proper operation of the digital circuit; in addition, the off-hook input to the POTS by-pass detector will be asserted. As a consequence, a (quasi) ground fault interrupt signal generation circuit will couple a (quasi) GFI signal to an RT power supply and relay control circuitry in the remote terminal, and al so over the wireline DSL path to GFI sense circuitry within the central office terminal.

In response to the GFI signal, control circuits in each of the COT and the RT de-energize relay circuits associated with respective POTS by-pass paths around the DSL multiplexers, and thereby provide a direct analog (POTS) by-pass signaling path between the customer's POTS phone at the RT and a POTS switch at the COT. Once this POTS by-pass signaling path has been established between the customer's POTS phone and the POTS switch, an on-hook detector in the central office terminal monitors the state of the by-pass link in order to determine when the call has ended (the customer has gone back on-hook).

When the POTS call has been terminated (the customer's phone goes back on-hook), the on-hook detector signals the COT's relay control circuit, causing the COT's relay coil to be re-energized, thereby returning the relay switch condition in the COT to its energized state for normal DSL operation conditions and decoupling the POTS by-pass path in the COT. This relay switching operation in the COT also causes span power to be reapplied to the DSL link, re-establishing power in the RT. With span-sourced power restored in the RT, its relay control circuit re-energizes RT relay coils for the POTS by-pass path, decoupling the POTS by-pass path in the RT, and restoring the RT to normal DSL communications.

DETAILED DESCRIPTION

Figure 1:
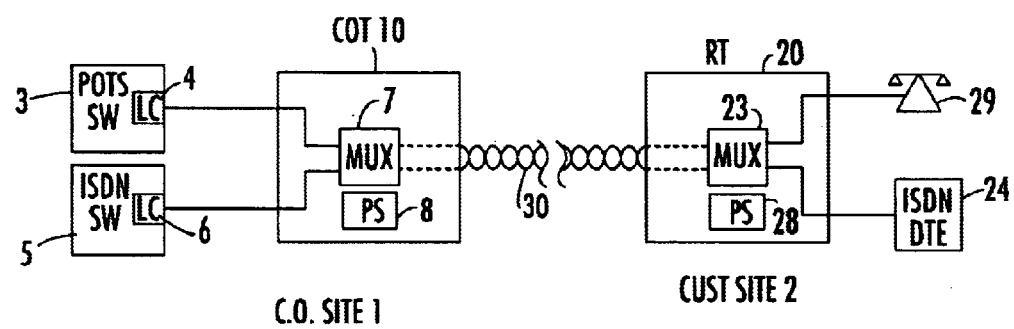
FIG. 1 diagrammatically illustrates a reduced complexity example of a span-powered DSL system for supplying POTS and ISDN communication services over a local loop between a central office site and a customer premises site.

Before describing in detail the new and improved emergency POTS by-pass mechanism of the present invention, it should be observed that the invention resides primarily in prescribed modular arrangements of conventional communication circuits and associated signal processing components and attendant supervisory control circuitry therefor, that controls the operations of such circuits and components. In a practical implementation that facilitates their incorporation into existing printed circuit cards of central office terminal and remote terminal resident telecommunication equipment, these modular arrangements may be implemented as application specific integrated circuit (ASIC) chip sets, as a non-limiting example.

Consequently, the configuration of such arrangements of circuits and components and the manner in which they are interfaced with other telecommunication equipment have, for the most part, been illustrated in the drawing is by readily understandable block diagrams, which show only those specific details that are pertinent to the present invention, so as not to obscure the disclosure with details which will be readily apparent to those skilled in the art having the benefit of the description herein. Thus, the block diagram illustrations are primarily intended to show the major components of the invention in a convenient functional grouping, whereby the present invention may be more readily understood.

Figure 2:
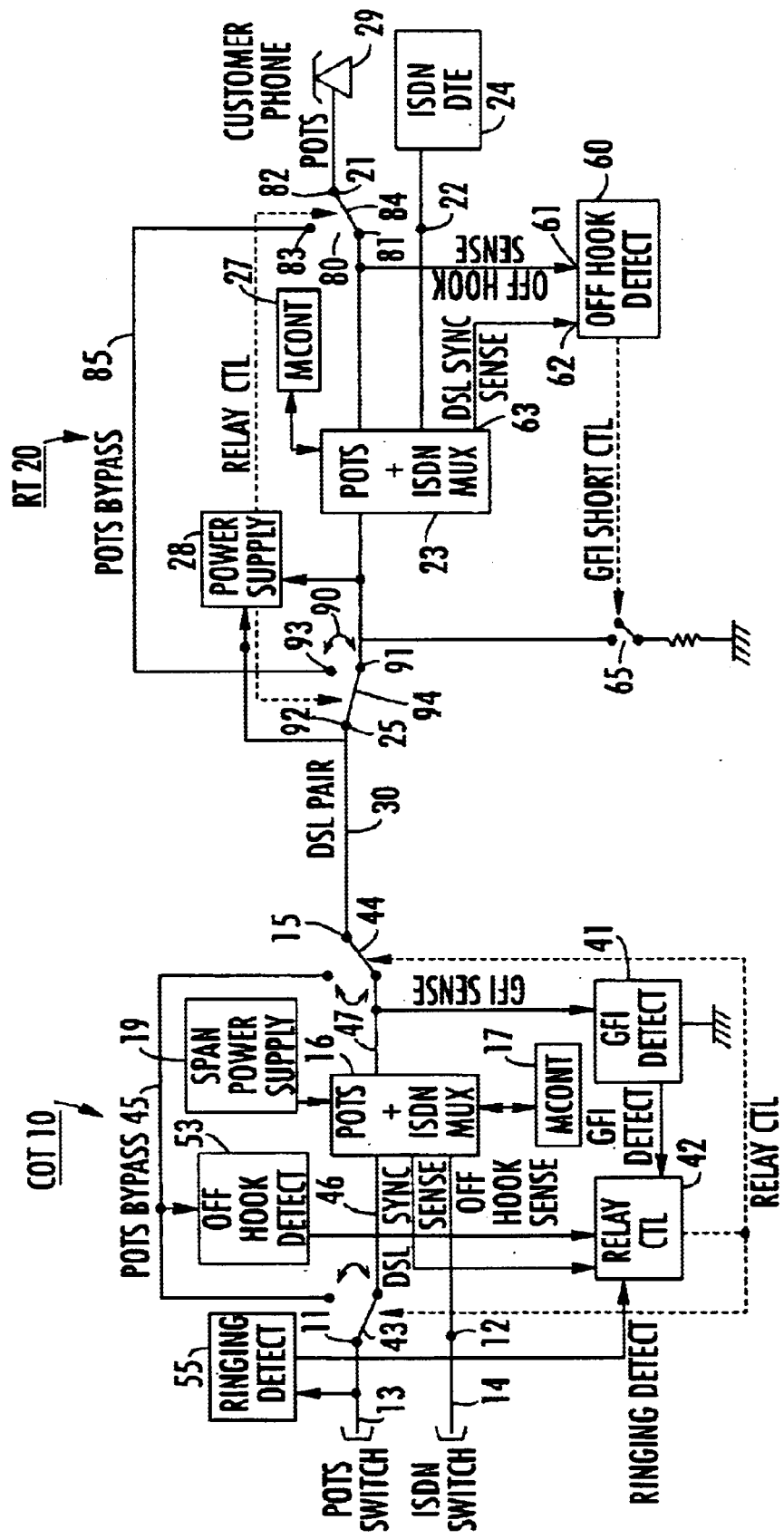
FIG. 2 is a reduced complexity diagrammatic illustration of the overall architecture of a digital subscriber loop (DSL) wireline communication system containing the emergency POTS back-up mechanism of the present invention.

A reduced complexity illustration of the overall architecture of a digital subscriber loop (DSL) wireline communication system in which the emergency POTS back-up mechanism is installed is diagrammatically illustrated in FIG. 2, as comprising a central office terminal (COT) 10, a remote terminal 20, and a two-wire DSL metallic pair 30, which provides telecommunication signaling transport therebetween. As described above with reference to FIG. 1, the COT 10 is configured to provide both analog (POTS) connectivity and digital communication (e.g., ISDN) connectivity with respective POTS and ISDN switches of a telecommunication service provider.

For this purpose, on the network side, the COT 10 has an analog signaling port 11 coupled via an analog signaling link 13 to a POTS switch of a telecommunication service provider. A digital signaling port 12 is coupled by way of a digital signaling link 14 to a digital (e.g., ISDN) switch. On the local loop side, the COT 10 has a DSL port 15 coupled to the two-wire DSL metallic pair 30. Both ISDN and POTS channels are multiplexed onto the DSL pair by way of a DSL/POTS multiplexer 16, under supervisory control of the COT's micro-controller 17. Power for the two-wire link is provided by a span power supply 19.

In accordance with the present invention, the circuit architecture of the COT 10 is augmented by a control signal detector 41, which is operative to monitor the two-wire path 30 for a (quasi) ground fault interrupt (GFI) signal that may be generated by the remote terminal 20. As described briefly above, the remote terminal generates a (quasi) GFI signal in response to an off-hook condition of a POTS phone at the remote terminal during a lack of normal operating condition of the DSL circuit. Such a lack of normal operating condition may be due to a less than full digital communication synchronization, as a non-limiting example.

The output of the ground fault signal detector 41 is coupled to a relay control circuit 42, which is operative to controllably energize a POTS by-pass relay coil having a pair of switched contact arms 43 and 44. During normal operating conditions, the POTS by-pass relay coil is energized, to urge the contact arms 43 and 44 in the positions shown in FIGS. 2–4, away from a POTS by-pass link 45. Switched contact arm 43 is controllably switch able between common analog signaling port 11 and either an analog link 46 of the multiplexer 16 or POTS by-pass link 45. The switched contact arm 44 is controllably switch able between DSL port 15 and either a link 47 with the multiplexer 16 or POTS by-pass link 45.

The COT 10 further includes an on-hook detector 53 coupled to the POTS by-pass link 45 and having an output coupled to the relay control circuit 42. The on-hook detector 53 is used to monitor the state of the by-pass link 45 in the course of a POTS by-pass call to determine when the by-pass POTS call as been completed. Once the POTS call has been completed, the on-hook detector .53 signals the relay control circuit 42, causing its relay coil to be re-energized and thus return the relay switch condition in the COT to normal DSL operations shown in FIGS. 2–4.

In addition, a ringing detector 55 is coupled to the analog signaling link 13 and has an output coupled to the relay control circuit 42. The ringing detector 55 is operative to detect incoming calls to the customer's POTS phone from the CO POTS switch. If an incoming call is detected during a lack of normal operating condition of the DSL circuit, then the COT unit shuts off span power to the remote terminal 20, causing the remote terminal to go into POTS bypass mode. The COT also goes into POTS bypass mode, by de-energizing its bypass relays, thus completing the analog (POTS) signaling path from the CO POTS switch to the customer's phone via the POTS bypass path.

On the customer premises equipment (CPE) side, the RT 20 has an analog signaling port 21 coupled via an analog signaling link to a POTS phone 29 at the customer site. A digital signaling port 22 is coupled via a digital signaling link to a digital terminal device: (e.g., ISDN terminal equipment) 24. On the local loop side, the RT 20 has a DSL port 25 coupled to the two-wire DSL metallic pair 30. The analog and digital ports are multiplexed to the DSL port 25 by means of a DSL/POTS multiplexer 23, under supervisory control of the RT's micro-controller 27. Power for controlling the operation of the circuitry of the RT 20 is provided by an internal power supply circuit 28, which is transformer-coupled through a filter/bridge circuit to the wireline 30, so as to derive its power from the isolated span supply in the COT 10.

Similar to the COT 10, the circuit architecture of the RT 20 is augmented by an emergency POTS by-pass condition detector 60, which continuously monitors the analog and digital signaling paths through the DSL/POTS multiplexer 23 for a signaling state of the RT associated with an emergency POTS condition. In particular, the detector 60 monitors the analog signaling path for an off-hook condition of the customer's POTS phone 29, and also monitors the digital signaling path for a lack of normal operating condition (e.g., associated with a not fully in-sync condition of the digital terminal device).

For this purpose, the POTS by-pass condition detector 60 has a first input 61 coupled to a first terminal 81 of a first relay activated POTS by-pass switch 80. In normal operating conditions, the first terminal 81 is coupled through switch contact arm 84 to a second, common terminal 82 terminating the analog signaling port 21, to which the customer's POTS phone 29 is connected. Detector 60 also has a second input 62 coupled to a DSL sync port 63 of the multiplexer 23. POTS by-pass condition detector 60 has an output coupled to a ground fault interrupt signal generation circuit 65. Ground fault interrupt signal generation circuit 65 has its output coupled to a first terminal 91 of a second relay activated switch 90, to which the multiplexer 23 is coupled. A common terminal 92 of the second relay activated switch 90 is coupled to the DSL port 25. In normal operating conditions, the common terminal 92 is coupled through contact arm 94 to the first terminal 91, so that the DSL link 30 is coupled to the DSL multiplexer 23. A second terminal 93 of relay switch 90 is coupled to a POTS by-pass link 85.

The output of the ground fault interrupt signal generation circuit 65 is further coupled to the RT power supply 28. In addition to providing power for the circuitry of the RT, the power supply 28 is operative to controllably energize a POTS by-pass relay coil, which is operative to controllably switch the contact positions of relay contact arms 84 and 94 of the first and second relay activated switch circuits 80 and 90, respectively. As in the COT 10, during normal operating conditions, the POTS by-pass relay coil of the RT is energized so as to urge the contact arms 84 and 94 in the positions shown in FIGS. 2–4, away from a POTS by-pass link 85.

Figure 3:
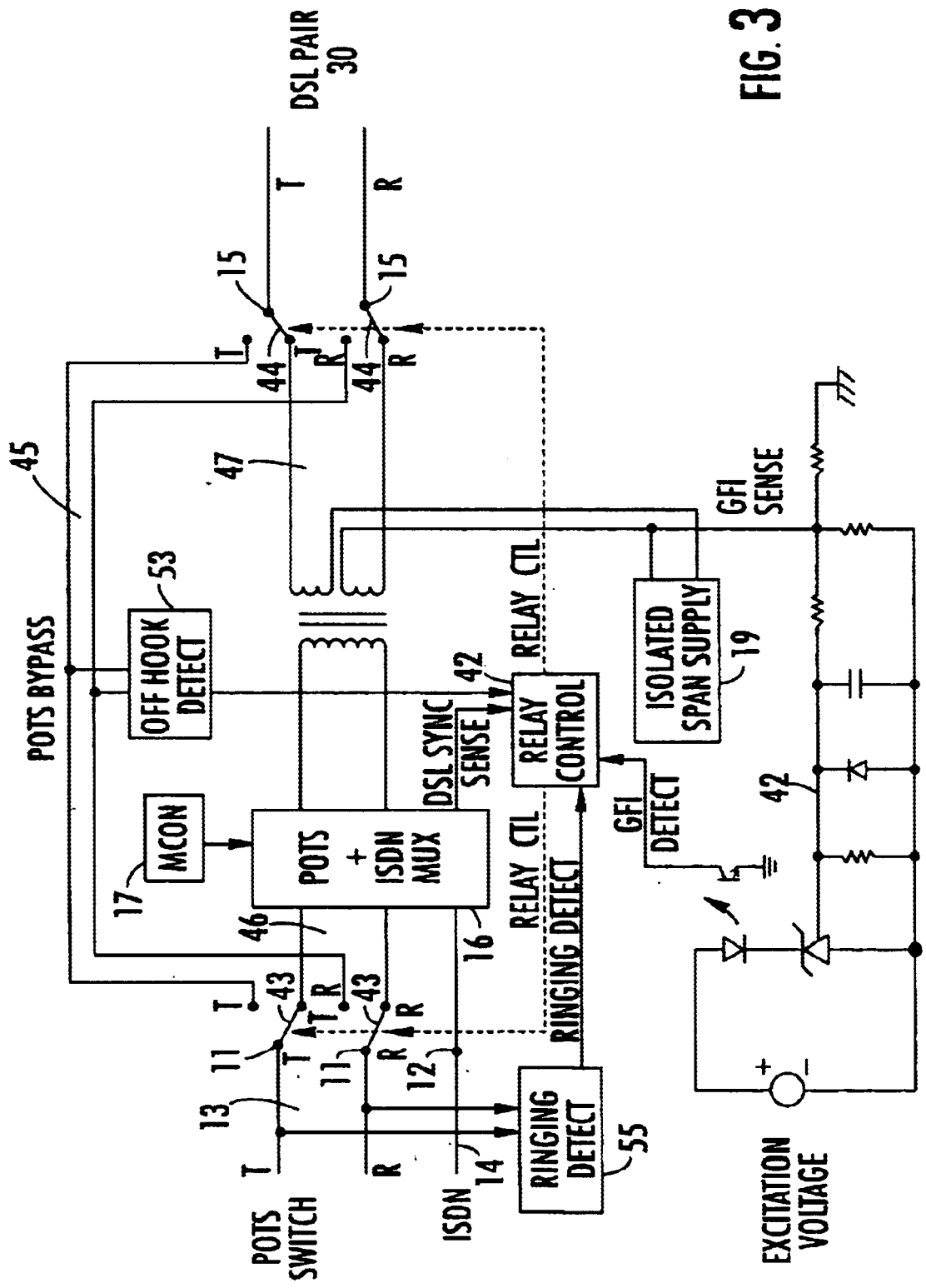
FIG. 3 shows the configuration of the central office terminal 10 of the system diagram of FIG. 2.
Figure 4:
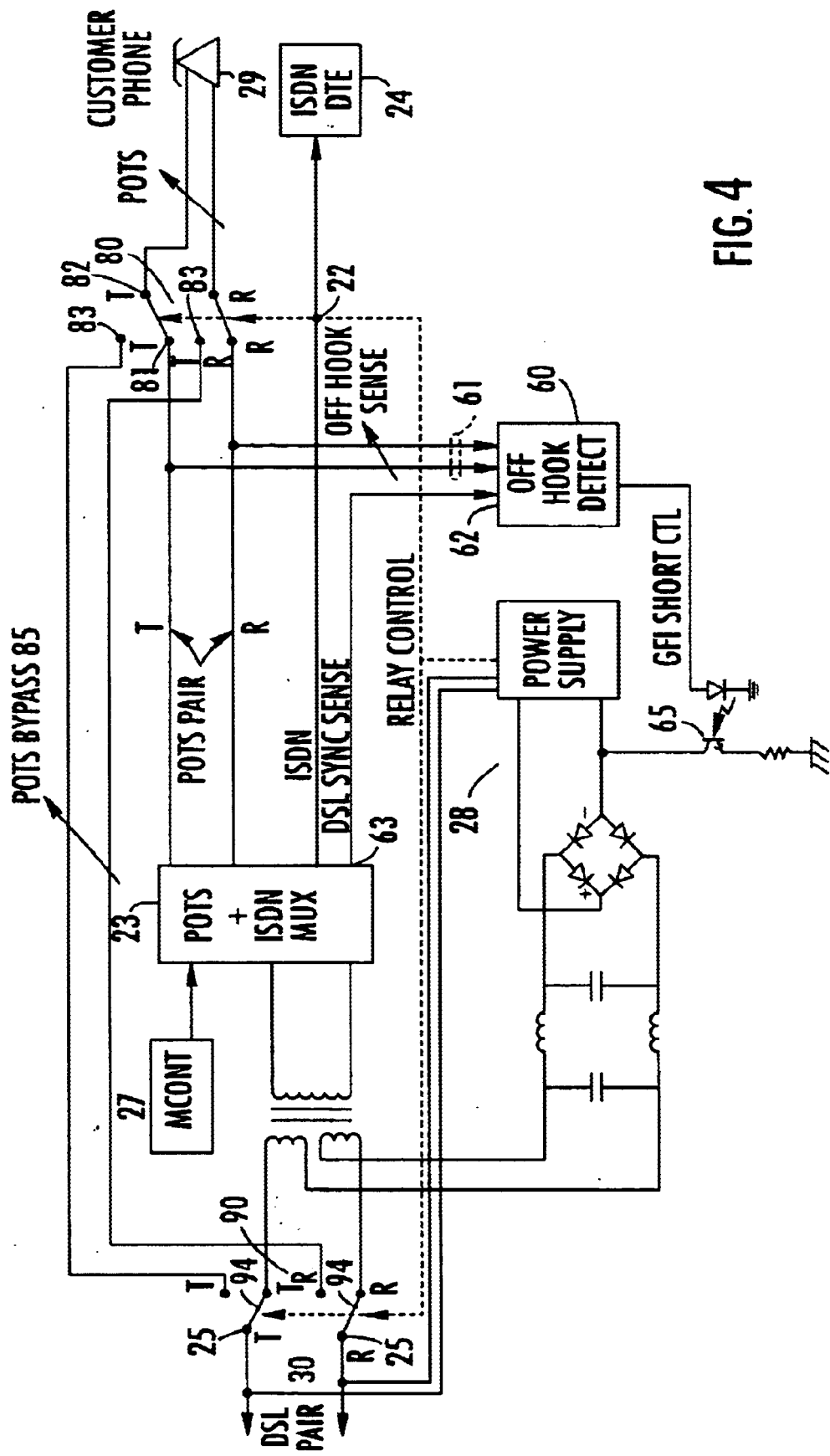
FIG. 4 shows the configuration of, the remote terminal 20 of the system diagram of FIG. 2.

For a normal operating condition of the DSL circuit, signaling path connectivity through the central office terminal 10 and the remote terminal 20 is by way of the DSL/POTS multiplexer circuitry, as shown in FIGS. 2–4. In this mode, the state of the DSL sync input to the POTS by-pass condition detector 60 in the RT 20 indicates proper operation of the digital circuit, so that the output of the detector 60 is in a non-asserted state. As a consequence, a fully functional digital (e.g., ISDN) communication path is provided between the customer's digital terminal equipment and the digital switching equipment at the central office site by way direct connections thereof with multiplexer circuitry within each of the COT 10 and the RT 20, and the relay switch connections of the DSL multiplexer circuitry with the DSL wireline path 30.

In addition, POTS connectivity is available through the each of the relay controlled switch connections with the DSL wireline path 30 and connections through the POTS port 21 of the RT 20 with the customer's POTS phone 29, and through the analog signaling port 11 of the COT 10 to the POTS switch. This normal operation connectivity state continues to be maintained, as long as such normal DSL operating conditions are present, so as to provide for both analog and digital communications, including allowing customer to place a POTS call, by way of the circuitry of each of the COT 10 and RT 20.

This normal operation connectivity state shown in FIGS. 2–4 will also be maintained, even in the absence of a fully functional DSL link, so long as there is no attempt by a customer to place a POTS call. As noted above, as a non-limiting example, the absence of a fully functional DSL link could be due to a less than fully synchronized condition of the DSL link, during initialization (including transmission and detection of a training sequence) of the DSL circuit. Unless the customer attempts to place a POTS call during this mode, the connectivity condition shown in FIGS. 2–4 is maintained.

However, if the customer attempts to place a POTS call (the POTS phone 29 goes off-hook) during a less than fully functional state of the DSL circuit, the state of the DSL sync input to the RT's POTS by-pass condition detector 60 will indicate non-proper operation of the digital circuit, and the off-hook input to the POTS by-pass detector 60 will be asserted. As a consequence, the output of the detector 60 in the RT 20 will change to its asserted state, causing the ground fault interrupt signal generation circuit 65 to couple a (quasi) GFI signal to the RT power supply 28 in the RT 20, and over the DSL path 30 to the ground fault sense circuitry within the COT 10. The respective relay control circuits in each of the COT 10 and the RT 20 are thereby triggered, so as to de-energize the relay coils in each of the COT 10 and the RT 20.

Since each relay coil is de-energized, the relays switch contacts transition from their states shown in FIGS. 2–4 to the POTS by-pass links 45 and 85, thereby providing a direct analog signaling path via the POTS by-pass paths and the DSL wireline path 30 between the customer's POTS phone 29 at the RT 20 and the POTS switch at the COT 10. With a POTS by-pass signaling path being provided between the customer's POTS phone 29 at the RT 20 and the POTS switch at the COT 10, the off-hook detector monitors the state of the by-pass link 45, as described above.

Once the POTS call has terminated, the on/off-hook detector 53 signals the relay control circuit 42, causing the COT's relay coil to be re-energized, thereby returning the relay switch condition in the COT 10 to that for normal DSL operation conditions shown in FIGS. 2–4. This relay switching operation in the COT 10 also causes the span power to be reapplied to the DSL link 30, re-establishing power to the RT 20. With span-sourced power restored to the RT 20, its relay control circuit re-energizes the RT relay coils, switching the positions of relay arms 84 and 94 of the relay activated switch circuits 80 and 90, respectively, back to those for normal DSL communications, shown in FIGS. 2–4, described above.

As will be appreciated from the foregoing description, by relatively simple switched by-pass modifications of the signaling circuits and network termination interface components of a central office terminal and a remote terminal, the lifeline POTS by-pass mechanism of the present invention is effective to ensure continuous telephone service to a residential customer premises served by a DSL, such as one used for ISDN, without requiring that the customer pay for an additional POTS line as an emergency back-up. For a fully functional DSL circuit, the auxiliary POTS by-pass paths are decoupled from the terminal signaling equipment. However, in the event that the subscriber places a POTS call during a less than fully functional condition of the DSL circuitry, a ground fault circuit causes the by-pass paths to be immediately 'switched-in' circuit with the wireline, thereby providing a 'lifeline' POTS by-pass path between the central office and the subscriber's POTS phone.

While I have shown and described several embodiments in accordance with the present invention, it is to be understood that the same is not limited thereto but is susceptible to numerous changes and modifications as known to a person skilled in the art, and I therefore do not wish to be limited to the details shown and described herein, but intend to cover all such changes and modifications as are obvious to one of ordinary skill in the art.

What is claimed is:

1. For use with digital subscriber loop (DSL) communication equipment that provides digital communication capability over a wireline path between a digital terminal device at a customer site and digital communication equipment at a telecommunication service provider site, an arrangement for supplying plain old telephone service (POTS) capability between said customer site and said telecommunication service provider site comprising:

a first standby POTS by-pass path controllably connectable between said wireline path and a POTS phone at said customer site;

a second standby POTS by-pass path controllably connectable between said wireline path and a POTS switch at said telecommunication service provider site; and control circuitry, which is operative to controllably place said first and second standby POTS by-pass paths in a communication path with said wireline path, said POTS phone at said customer site, and said POTS switch at said telecommunication service provider site, in response to an off-hook condition of said POTS phone and lack of normal operating condition of said digital terminal device, and wherein said control circuitry is operative to supply a ground fault indication signal over said wireline path from said customer site to said telecommunication service provider site, said ground fault indication signal being detected by a ground fault indication signal detector at said telecommunication service provider site, in response to which said ground fault indicator signal detector is effective to controllably place said second standby POTS by-pass path in a communication path with said wireline and said POTS switch.

2. An arrangement according to claim 1, wherein said customer site further includes a first switching device that is selectively operative to couple said wireline path to one of said digital terminal device and said POTS phone during said normal operating condition of said digital terminal device, and wherein said control circuitry is operative to prevent said first switching device from providing a communication path therethrough between said POTS phone and said wireline path, in response to said off-hook condition of said POTS phone and said lack of normal operating condition of said digital terminal device.

3. An arrangement according to claim 2, wherein said telecommunication service provider site further includes a second switching device that is selectively operative to couple said wireline path to one of a digital communication path and said POTS switch during said normal operating condition of said digital terminal device, and wherein said control circuitry is operative to prevent said second switching device from providing a communication path therethrough between said POTS switch and said wireline path, in response to said off-hook condition of said POTS phone and said lack of normal operating condition of said digital terminal device.

4. An arrangement according to claim 2, wherein said telecommunication service site includes an on-hook detector coupled to said second standby POTS by-pass path and being operative to cause said control circuitry to controllably disable said first and second standby POTS by-pass paths in response to said POTS phone device going back on-hook.

5. For use with digital subscriber loop (DSL) communication equipment that provides digital communication capability over a wireline path between a digital terminal device at a customer site and digital communication equipment at a telecommunication service provider site, an arrangement for providing plain old telephone service (POTS) capability between said customer site and said telecommunication service provider site comprising:

a remote terminal unit configured to interface customer communication equipment with said wireline path, and including
a POTS port adapted to be coupled to a POTS phone,
a digital port adapted to be coupled to said digital terminal device,
a wireline port adapted to be coupled to said wireline path,
a switching device operative to controllably couple said wireline port with said POTS port and said digital port during a normal operating condition of said digital terminal device, and
a POTS by-pass path adapted to couple said POTS port to said wireline port, in response to an off-hook condition of said POTS phone and a lack of normal operating condition of said digital terminal device; and a service provider terminal unit configured to interface service provider communication equipment with said wireline path, and including
a POTS port adapted to be coupled to a POTS switch,
a digital port adapted to be coupled to said digital communication equipment at said telecommunication service site,
a wireline port adapted to be coupled to said wireline path,
a switching device operative to selectively couple said wireline port with one of said POTS switch port and said digital communication port during a normal operating condition of said digital terminal device, and
a POTS by-pass path adapted to couple said POTS switch port to said wireline port, in response to said off-hook condition of said POTS phone and said lack of normal operating condition of said digital terminal device, and wherein said remote terminal unit includes control circuitry that is operative to supply a ground fault indication signal over said wireline path from said customer site to said telecommunication service provider site, said ground fault indication signal being detected by a ground fault indication signal detector at said telecommunication service provider site, in response to which said ground fault indicator signal detector is effective to controllably cause said POTS by-pass path of said service provider terminal unit to be placed in circuit with said wireline path and said POTS switch.

* * * * *